United States Patent
Thangarasa et al.

(10) Patent No.: US 10,015,680 B2
(45) Date of Patent: Jul. 3, 2018

(54) DETECTING NEIGHBOR CELL SYSTEM INFORMATION BY LOW COMPLEXITY USER EQUIPMENT

(71) Applicant: Telefonaktiebolaget L M Ericsson (publ), Stockholm (SE)

(72) Inventors: Santhan Thangarasa, Vällingby (SE); Joakim Axmon, Kävlinge (SE); Muhammad Kazmi, Bromma (SE); Kazuyoshi Uesaka, Kawasaki (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 76 days.

(21) Appl. No.: 14/432,078

(22) PCT Filed: Jan. 28, 2015

(86) PCT No.: PCT/SE2015/050085
§ 371 (c)(1),
(2) Date: Mar. 27, 2015

(87) PCT Pub. No.: WO2016/048210
PCT Pub. Date: Mar. 31, 2016

(65) Prior Publication Data
US 2016/0150419 A1 May 26, 2016

Related U.S. Application Data

(60) Provisional application No. 62/055,917, filed on Sep. 26, 2014.

(51) Int. Cl.
*H04L 12/28* (2006.01)
*H04W 24/02* (2009.01)
(Continued)

(52) U.S. Cl.
CPC .......... *H04W 24/02* (2013.01); *H04W 4/005* (2013.01); *H04W 4/70* (2018.02); *H04W 16/26* (2013.01);
(Continued)

(58) Field of Classification Search
CPC ..... H04W 24/02; H04W 16/26; H04W 4/005; H04W 36/0061; H04W 48/16; H04W 36/0083; H04W 8/22
See application file for complete search history.

(56) References Cited

U.S. PATENT DOCUMENTS

2005/0281228 A1* 12/2005 Oh .................. H04W 36/18
370/331
2006/0171482 A1* 8/2006 Trachewsky ........... H04B 7/04
375/267
(Continued)

FOREIGN PATENT DOCUMENTS

| EP | 2 563 064 | 2/2013 |
|---|---|---|
| WO | WO 2011/126420 | 10/2011 |
| WO | WO 2013/170780 | 11/2013 |

OTHER PUBLICATIONS

Change Request; 3GPP TSG-RAN WG4 Meeting #47bis; Munich; Title: General updates to TS 36.133; Source to WG: Nokia Siemens Networks; Source to TSG: R4 (R4-081584)—Jun. 16-20, 2008. Due to size, this reference has been split into two documents.
(Continued)

*Primary Examiner* — Lonnie V Sweet
(74) *Attorney, Agent, or Firm* — Baker Botts, LLP

(57) ABSTRACT

According to some embodiments, a method in a network node comprises determining a transmitter configuration of a target network node of a target cell and determining a receiver configuration of a first wireless device. The method further comprises communicating a request to the first wireless device to acquire system information of the target cell if the receiver configuration of the first wireless device indicates that the first wireless device comprises at least two antennas for acquiring system information of the target cell, or the transmitter configuration of the target network node indicates that the target network node comprises at least two antennas for transmitting system information of the target cell.

26 Claims, 6 Drawing Sheets

(51) Int. Cl.
  *H04W 36/00*    (2009.01)
  *H04W 4/00*     (2018.01)
  *H04W 4/70*     (2018.01)
  *H04W 16/26*    (2009.01)
  *H04W 48/16*    (2009.01)
  *H04W 8/22*     (2009.01)

(52) U.S. Cl.
  CPC ... *H04W 36/0061* (2013.01); *H04W 36/0083* (2013.01); *H04W 48/16* (2013.01); *H04W 8/22* (2013.01)

(56) References Cited

U.S. PATENT DOCUMENTS

| | | | |
|---|---|---|---|
| 2013/0039342 A1 | 2/2013 | Kazmi | |
| 2014/0038619 A1* | 2/2014 | Moulsley | H04B 7/024 455/446 |
| 2015/0133130 A1* | 5/2015 | Gupta | H04W 48/16 455/450 |

OTHER PUBLICATIONS

Change Request; 3GPP TSG-RAN WG4 Meeting #72bis; Singapore; Title: SI reading requirements for UE category 0 with 1 Rx in FDD, TDD and HD-FDD; Source to WG: Ericsson; Source to TSG: R4 (R4-146422) Oct. 6-10, 2014.
PCT International Search Report for International application No. PCT/SE2015/050085—dated Mar. 13, 2015.
PCT Written Opinion of the International Searching Authority for International application No. PCT/SE2015/050085—dated Mar. 13, 2015.

* cited by examiner

DETECTING NEIGHBOR CELL SYSTEM INFORMATION BY LOW COMPLEXITY USER EQUIPMENT

PRIORITY

This nonprovisional application is a U.S. National Stage Filing under 35 U.S.C. § 371 of International Patent Application Serial No. PCT/SE2015/050085, filed Jan. 28, 2015, and entitled "DETECTING NEIGHBOR CELL SYSTEM INFORMATION BY LOW COMPLEXITY USER EQUIPMENT" which claims priority to U.S. Provisional Patent Application No. 62/055,917 filed Sep. 26, 2014, both of which are hereby incorporated by reference in their entirety.

TECHNICAL FIELD

Particular embodiments relate generally to detecting system information in wireless communications networks, and more particularly to detecting neighbor cell system information by low complexity user equipment.

BACKGROUND

Wireless devices, such as user equipment (UEs), detect system information (SI) of neighboring cells in Evolved Universal Mobile Telecommunications System (UMTS) Terrestrial Radio Access (E-UTRA). The SI includes a Master Information Block (MIB) and System Information Block Type 1 (SIB1) that the UE uses to identify the Cell Global Identifier (CGI) of a new cell. The MIB is transmitted on the Physical Broadcast Channel (PBCH). The MIB is transmitted in subframe 0 with a periodicity of 40 ms and 4 redundancy versions are transmitted within this period. The SIB1 is multiplexed into the Physical Downlink Shared channel (PDSCH). The SIB1 is transmitted on subframe 5 and it has a periodicity of 80 ms. If the UE has previously detected the new cell, the UE may already know the Physical Cell Identity (PCI) of the new cell.

The method of detecting the CGI may be the same for frequency division duplex (FDD), half duplex FDD (HD-FDD), and time division duplex (TDD). A UE may read SI for the acquisition of CGI during measurement gaps that are autonomously created by the UE.

In Long Term Evolution (LTE), the MIB is transmitted on the broadcast channel (BCH) and includes a limited number of the most essential and most frequently transmitted parameters that are needed to acquire other information from the cell. For example, the MIB may include downlink (DL) bandwidth, physical hybrid automatic repeat request (HARQ) indication channel (PHICH) configuration, and system frame number (SFN).

The MIB is transmitted periodically with a periodicity of 40 ms and repetitions are transmitted within the 40 ms period. The first transmission of the MIB is scheduled in subframe 0 of radio frames for which the SFN modulo 4=0, and repetitions are scheduled in subframe 0 of all other radio frames.

In LTE, the SIB1 may include, for example, public land mobile network (PLMN) identity, cell identity, closed subscriber group (CSG) identity and indication, frequency band indicator, SI-window length, and scheduling info for other SIBs.

The LTE SIB1 may indicate whether a change has occurred in the SI messages. The UE is notified about a coming change in the SI by a paging message, from which the UE will know that the system information will change at the next modification period boundary. The modification period boundaries are defined by SFN values for which SFN modulo m=0, where m is the number of radio frames comprising the modification period. The modification period is configured by system information.

The LTE SIB1, as well as other SIB messages, is transmitted on the downlink shared channel (DL-SCH). The SIB1 is transmitted with a periodicity of 80 ms and repetitions are transmitted within the 80 ms period. The first transmission of SIB1 is scheduled in subframe 5 of radio frames for which the SFN modulo 8=0, and repetitions are scheduled in subframe 5 of all other radio frames for which SFN modulo 2=0.

In case of inter-radio access technology (inter-RAT) UMTS Terrestrial Radio Access Network (UTRAN), the UE reads the MIB and System Information Block Type 3 (SIB3) of the target UTRAN cell to acquire its CGI.

To support mobility, a UE identifies a number of neighbor cells and reports their physical cell identity (PCI) to a serving network node (e.g., serving eNodeB in E-UTRAN). The serving network node may request the UE to report neighbor cell measurements such as Reference Signal Received Power (RSRP) and/or Reference Signal Received Quality (RSRQ) in E-UTRAN or common pilot channel (CPICH) Received signal Code Power (RSCP) and/or CPICH Ec/No in UTRAN or GSM EDGE Radio Access Network (GERAN) carrier received signal strength indication (RSSI) or pilot strength for code division multiple access 2000 (CDMA2000)/high rate packet data (HRPD). In response to the reported UE measurement, the serving network node sends handover command to the UE.

With small cell sizes in dense deployment scenarios (e.g., femto cells, restricted small cells like femto closed subscriber group, pico cells, etc.), PCIs are frequently reused. To prevent a handover (HO) command to a non-allowed home base station (e.g., CSG cell), the serving network node may also request the UE to decode and report the CGI of the target cell. This may be referred to as home inbound mobility. The CGI is unique in the network facilitating the network to distinguish between macro base station (BS) and home BS or to uniquely identify that the reported cell belongs to a CSG.

The procedure and the associated requirements for the target cell's CGI reporting are specified in E-UTRAN. One aspect of CGI decoding is that it is performed by the UE during the autonomous gaps, which are created by the UE itself. A reason for acquiring the target cell CGI during autonomous gaps is because a typical UE is not able to simultaneously receive the data from the serving cell and acquire the target cell's system information, which contains the CGI. Furthermore, CGI acquisition of an inter-frequency or inter-RAT target cell requires the UE to switch the carrier frequency. Thus, autonomous gaps are used for acquiring the target cell's CGI. The autonomous gaps are created both in uplink and downlink.

FIG. 1 illustrates autonomous gaps for acquisition of system information. The particular example illustrates E-UTRA FDD MIB and SIB1 acquisition. The 3GPP TS 36.133 standard assumes that a UE performs automatic gain control (AGC) on a target carrier before reading MIB and also before SIB1, and that 5 subframes may be blanked for performing AGC. Moreover, the standard assumes that 3 blocks from MIB and 3 redundancy versions from SIB1, from the same 40 and 80 ms period, respectively, are needed. Because the starting position of each acquisition is unknown, 5 gaps each with duration of 4 subframes are allocated for each MIB and SIB1 acquisition.

Using the self-organizing network (SON) function in E-UTRAN, network operators can automatically plan and tune network parameters and network nodes. A previous method was based on manual tuning, which is time and resource intensive requiring considerable work force involvement. Because of network complexity, large number of system parameters, multiple inter-radio access technologies (IRATs), etc., a method to test the self-organization in the network is advantageous.

A network operator may also add or delete a cell or a base station (with multiple cells). For example, during an early phase of network deployment new cells may be added more frequently than in later stages. In later stages, an operator may upgrade the network by adding more carriers or more base stations on the same carrier. The operator may also add cells related to another technology. When network elements are added or deleted, neighbor relation tables may change. An automatic approach for updating neighbor relation tables may be referred to as automatic neighbor cell relation (ANR) establishment and is part of the SON function. To ensure correct establishment of the neighbor cell relation, the serving cell requests the UE to report the CGI of the new target cell. The UE identifies the PCI of the new target cell and reports it back to the serving cell. During CGI acquisition, the UE reads the target cell's system information during autonomous gaps. Similar to home inbound mobility, CGI acquisition for ANR also interrupts the data from the serving cell.

E-UTRAN specifies Evolved CGI (ECGI) for intra-frequency ECGI reporting and inter-frequency ECGI reporting. In addition, E-UTRAN is expected to specify ECGI for inter-RAT UTRAN CGI reporting.

A UE is required to report an intra-frequency ECGI within about 150 ms from receiving a target intra-frequency cell SINR of at least −6 dB or higher. During the acquisition of the target cell's ECGI on the serving carrier frequency, the UE is allowed to create autonomous gaps in the downlink and uplink. Under continuous allocation the UE is required to transmit certain number of ACK/NACK on the uplink to ensure that the UE does not create excessive gaps.

The UE is also required to report an inter-frequency ECGI within about 150 ms from receiving a target inter-frequency cell SINR of at least −4 dB or higher. During the acquisition of the target cell's ECGI on the serving carrier frequency, the UE is allowed to create autonomous gaps in the downlink and uplink. This causes the UE to interrupt downlink reception and uplink transmission in the serving cell. Under continuous allocation, the UE is also required to transmit certain number of ACK/NACK on the uplink to ensure that the UE does not create excessive gaps.

In UTRAN, the target cell's CGI acquisition is much longer. For example, the target cell's CGI acquisition may be more than 1 second depending upon the periodicity of the SIB3, which contains the CGI. Furthermore, due to the autonomous gaps created by the UE to acquire the target cell's CGI, the interruption of the data transmission and reception from the serving cell can be 600 ms or longer.

Machine-to-machine (M2M) communication (also referred to as machine type communication (MTC)) establishes communication between machines and/or between machines and humans. The communications may comprise exchange of data, signaling, measurement data, configuration information, etc. The device size may vary from that of a wallet to that of a base station. The M2M devices are quite often used for applications like sensing environmental conditions (e.g., temperature reading, etc.), metering or measurement (e.g., electricity usage, etc.), fault finding or error detection, etc. In these applications the M2M devices are active for a short duration depending upon the type of service, such as about 200 ms every 2 seconds, about 500 ms every 60 minutes, or any other suitable period. The M2M device may also measure other frequencies or other RATs.

In general, MTC devices tend to be of low cost and low complexity. A low complexity UE that may be used for M2M operation may implement one or more low cost features, such as smaller downlink and uplink maximum transport block size (e.g., 1000 bits) and/or reduced downlink channel bandwidth of 1.4 MHz for data channel (e.g., PDSCH). A low cost UE may also comprise of a half-duplex (HD-FDD) and one or more of the following additional features: single receiver (1 Rx) at the UE, smaller downlink and/or uplink maximum transport block size (e.g., 1000 bits), and reduced downlink channel bandwidth of 1.4 MHz for data channel. The low cost UE may also be referred to as a low complexity UE.

Path loss between an M2M device and a base station can be large in some scenarios. For example, path loss may be large for an M2M device in a remote location (such as an M2M sensor or metering device located in the basement of a building). In such scenarios receiving a signal from the base station may be challenging. For example, the path loss can be 20 dB worse than normal operation. Enhanced coverage in uplink and downlink may alleviate such challenges. Examples of techniques in the UE and/or in the radio network node for enhancing the coverage include transmit power boosting, repetition of transmitted signal, applying additional redundancy to the transmitted signal, use of advanced/enhanced receiver, etc. In general, when employing coverage enhancing techniques, the M2M may be referred to as operating in "coverage enhancing mode." A low complexity UE (e.g., UE with one receiver) may also be capable of supporting enhanced coverage mode of operation.

SUMMARY

According to some embodiments, a method in a network node comprises determining a transmitter configuration of a target network node of a target cell and determining a receiver configuration of a first wireless device. The method further comprises communicating a request to the first wireless device to acquire system information of the target cell if the receiver configuration of the first wireless device indicates that the first wireless device comprises at least two antennas for acquiring system information of the target cell, or the transmitter configuration of the target network node indicates that the target network node comprises at least two antennas for transmitting system information of the target cell.

In particular embodiments, the system information of the target cell comprises one or more of a cell global identifier, a system frame number, a master information block, and a system information block of the target cell.

In particular embodiments, a method in a wireless device comprises receiving a request from a network node to acquire system information of a first target cell from a first target network node. The method further comprises determining a transmitter configuration of the first target network node, determining a receiver configuration of the wireless device, and acquiring the system information of the first target cell if the receiver configuration of the wireless device indicates that the wireless device comprises at least two antennas for acquiring system information of the first target cell, or the transmitter configuration of the first target network node indicates that the first target network node comprises at least two antennas for transmitting system information of the first target cell.

According to some embodiments, a network node comprises a processor operable to determine a transmitter configuration of a target network node of a target cell and to determine a receiver configuration of a first wireless device. The processor is further operable to communicate a request to the first wireless device to acquire system information of the target cell if the receiver configuration of the first wireless device indicates that the first wireless device comprises at least two antennas for acquiring system information of the target cell, or if the transmitter configuration of the target network node indicates that the target network node comprises at least two antennas for transmitting system information of the target cell.

According to some embodiments, a wireless device comprises a processor operable to receive a request from a network node to acquire system information of a first target cell from a first target network node. The processor is operable to determine a transmitter configuration of the first target network node and to determine a receiver configuration of the wireless device. The processor is further operable to acquire the system information of the first target cell if the receiver configuration of the wireless device indicates that the wireless device comprises at least two antennas for acquiring system information of the first target cell, or the transmitter configuration of the first target network node indicates that the first target network node comprises at least two antennas for transmitting system information of the first target cell.

Particular embodiments may exhibit some of the following technical advantages. Particular embodiments may efficiently use radio resources in both eNodeBs and UEs. For example, a low complexity wireless device (such as UE implementations designed to support MTC, low range operation, etc.) may contain only one receiver to reduce UE cost, complexity, and power consumption. A low complexity wireless device with only one receiver, however, may not be suitable for acquiring SI of a cell for all types of BS transmit antenna modes. For example, a single receiver may not be adequate to detect particular radio signals in low SINR conditions. Thus, a low complexity wireless device may attempt and fail to acquire the SI of a cell under such conditions. The wireless device may waste radio resources trying to acquire SI that it is not able to acquire. In particular embodiments, a network node may determine whether a wireless device is likely able to acquire the SI of a target cell before signaling the wireless device to acquire the SI. In particular embodiments, single-receiver wireless devices may avoid creating unnecessary autonomous gaps and therefore may conserve radio resources. Particular embodiments may reduce baseband processing and power consumption in particular UEs. In particular embodiments, a network node may acquire SI of a target cell from another UE that is better equipped to acquire the SI, such as a UE that has more than one receiver. In particular embodiments, SIB1 may be decoded under worse radio conditions than would otherwise be possible in a UE without receiver diversity. In particular embodiments, SIB1 may be decoded more quickly than otherwise possible because a UE is not required to begin decoding at the start of an 80 ms period. Other technical advantages will be readily apparent to one skilled in the art from the following figures, description and claims.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Conventional UEs generally all apply the same procedure to read SI. The procedure assumes that a UE has at least two receivers. UEs with two receivers generally acquire the SI of an E-UTRA cell within a specified time period, such as 150 ms. By contrast, low complexity UE implementations (such as UE implementations designed to support MTC, low range operation, etc.) may contain only one receiver to reduce UE cost, complexity, and power consumption. Low complexity UE implementation may not be suitable for acquiring SI of a cell for all type of BS transmit antenna modes. Therefore, if the serving network node of a UE does not take into account the transmit antenna configuration of a target cell whose SI is to be acquired, the UE may fail to acquire the SI of that cell. A UE may waste radio resources trying to acquire SI that it is not able to acquire.

An object of the present disclosure is to obviate at least these disadvantages and provide an improved method to acquire SI that enables successful acquisition in low SINR environments. Embodiments of the present disclosure may use improved procedures to acquire the SI depending on particular UE or eNB configurations. In some embodiments, a method can be implemented in a network node (e.g., serving eNB) to selectively perform SI acquisition procedures for selected UEs.

Particular embodiments are described with reference to FIGS. 2-8 of the drawings, like numerals being used for like and corresponding parts of the various drawings. LTE is used throughout this disclosure as an example cellular system, but the ideas presented herein apply to other wireless communication systems as well.

Figure 1:
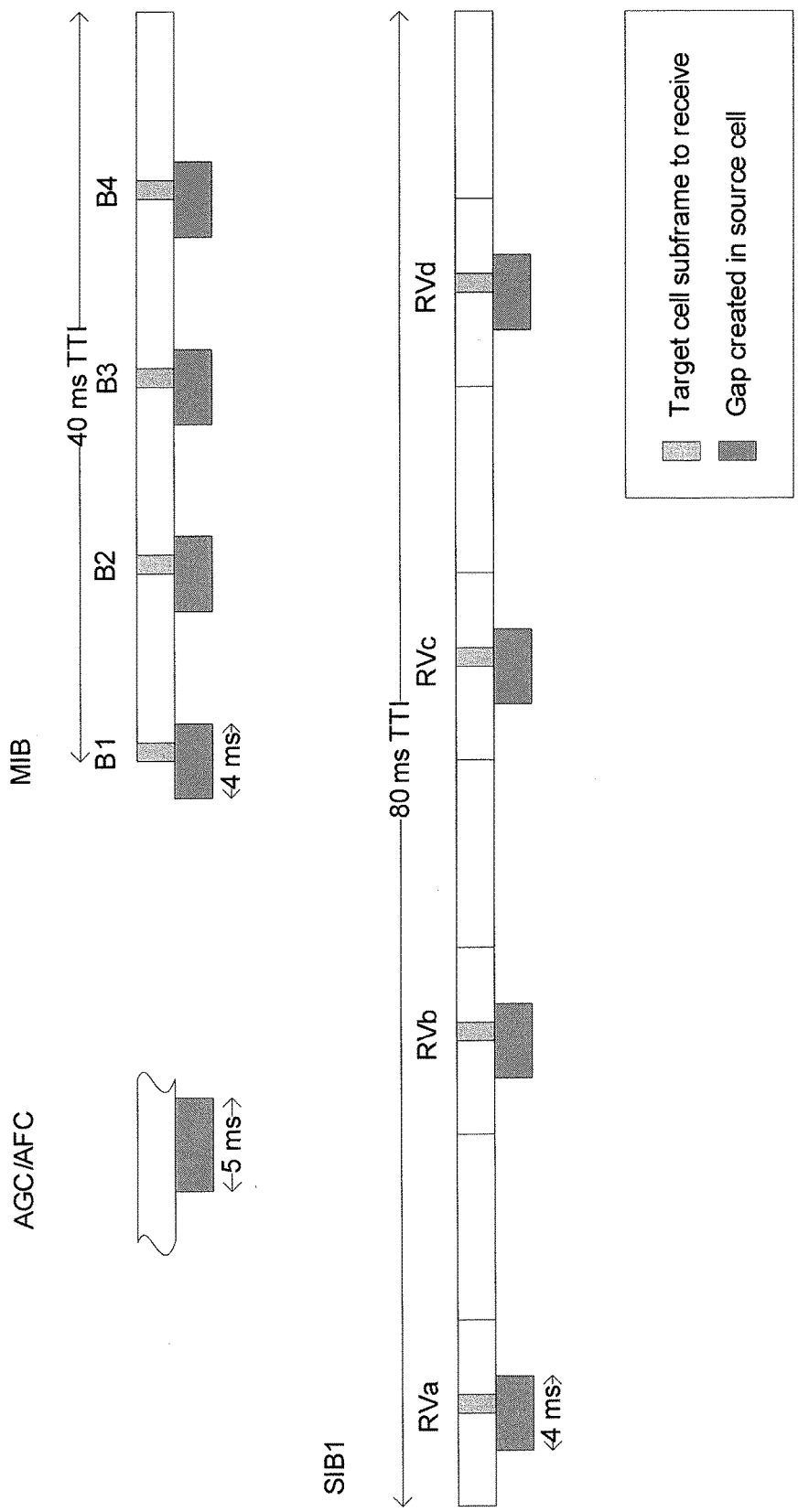
FIG. 1 illustrates autonomous gaps for acquisition of system information.
Figure 2:
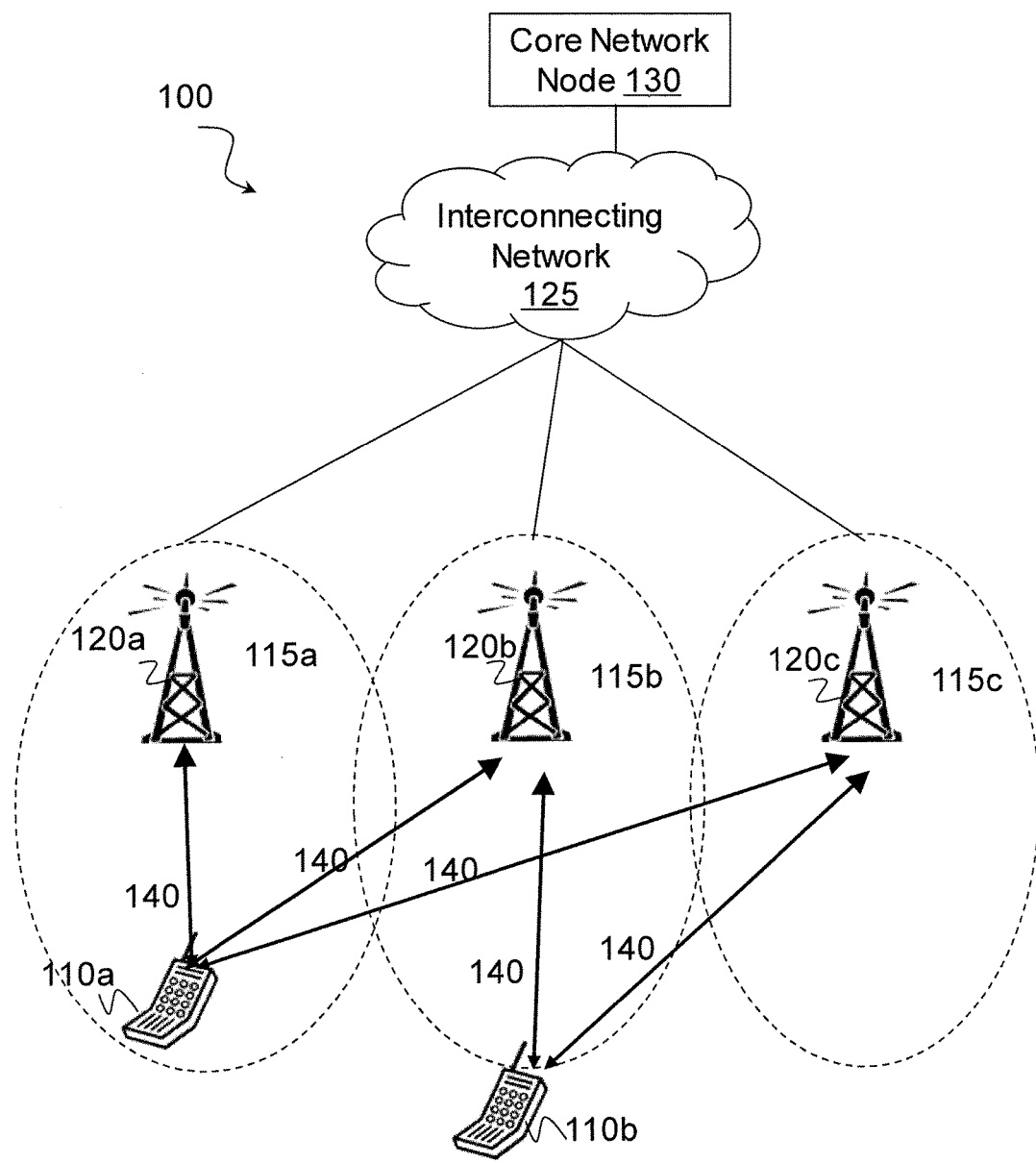
FIG. 2 is a block diagram illustrating an example wireless network, according to a particular embodiment.

FIG. 2 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of radio network nodes. The network nodes include network nodes 120 (such as base stations or eNodeBs), and a core network node 130. Radio network node 120 serves coverage area 115 (also referred to as cell 115).

In general, wireless devices 110 that are within coverage of radio network node 120 (e.g., within cell 115 served by network node 120) communicate with radio network node 120 by transmitting and receiving wireless signals 140. For example, wireless devices 110 and radio network node 120 may communicate wireless signals 140 containing voice traffic, data traffic, and/or control signals. Wireless signals 140 may include both downlink transmissions (from radio network node 120 to wireless devices 110) and uplink transmissions (from wireless devices 110 to radio network node 120). A network node 120 communicating voice traffic, data traffic, and/or control signals to wireless device 110 may be referred to as a serving network node 120 for the wireless device 110.

Core network node 130 manages the establishment of communication sessions and various other functionality for wireless communication devices 110 within coverage (or partial coverage) of the wireless network. The network nodes connect through interconnecting network 125, which refers to any interconnecting system capable of transmitting audio, video, signals, data, messages, or any combination of the preceding.

Each network node 120 may have a single transmitter or multiple transmitters for transmitting signals 140 to wireless devices 110. In some embodiments, network node 120 may comprise a multi-input multi-output (MIMO) system. In some embodiments, all network nodes 120 may have a single transmitter, all network nodes 120 may have multiple transmitters, or some network nodes 120 may have a single transmitter while other network nodes 120 may have multiple transmitters. For example, network node 120*a* may have two transmitters, network node 120*b* may have one transmitter, and network node 120*c* may have four transmitters. In particular embodiments, any network node 120 may have 1, 2, 4, 8 or any suitable number of transmitters.

Each wireless device 110 may have a single receiver or multiple receivers for receiving signals 140 from network nodes 120. For example, wireless device 110*a* may have two receivers and wireless device 110*b* may have one receiver. Other wireless devices 110 may have 1, 2, 4, 8 or any suitable number of receivers.

In particular embodiments, wireless device 110 may be able to receive SI on all of its receivers, or only on a subset of its receivers. In particular embodiments, wireless device 120 may be able to transmit SI on all of its transmitters, or only on a subset of its transmitters. In particular embodiments, wireless device 110 may dynamically adapt its receiver configuration (e.g., from 2 to 1 receiver) to save power, or for any other suitable purpose. In the following embodiments, when determining a number of transmitters of a network node or a number of receivers of a wireless device for acquiring SI, the number refers to the number of transmitters or number of receivers capable of transmitting or receiving SI. In the embodiments described herein, unless otherwise indicated, network node 120*a* has two transmitters, network node 120*b* has one transmitter, and network node 120*c* has four transmitters, all capable of transmitting SI. Wireless device 110*a* has two receivers and wireless device 110*b* has one receiver, all capable of receiving SI.

Wireless devices 110 may detect the SI of neighboring cells in wireless network 100. For example, wireless device 110*a* may communicate with network node 120*a* in cell 115*a*. Network node 120*a* may request wireless device 110*a* to acquire the SI of neighboring cell 115*b*. In particular embodiments, the SI may include a MIB and SIB1 that wireless device 110*a* may use to identify a CGI of target cell 115*b*.

Conventional UEs in E-UTRA include dual receivers (i.e., receiver diversity or dual receiver chains). These conventional UEs can generally acquire SI according to known procedures. The known procedures, however, do not take into account UE complexity. Low complexity UEs, such as category 0 UEs and/or UEs having a single receiver, may have difficulty acquiring SI according to the known procedures. For example, because downlink performance of a UE depends on its number of receive antennas, the ability of a UE to acquire SI may be negatively impacted when the UE includes only a single receiver. UEs with a single receiver may be unable to successfully decode the MIB and SIB within the existing E-UTRA requirements.

In some embodiments, a serving network node determines both a receiver configuration of a UE and a transmit antenna configuration of a target network node when requesting the UE to acquire an SI of the target cell served by the target network node. The serving network node may request the UE to acquire the SI of the target cell if the UE has two or more receivers or the target network node has two or more transmit antennas.

The UE requested to acquire the SI of the target cell attempts to acquire the SI if the UE has two or more receivers or if the target network node has two or more transmit antennas. In some embodiments, the UE informs the serving network node if it is unable to acquire the SI. For example, the UE may inform the serving network node that it did not acquire the SI because the UE has a single receiver and the target network node has a single transmit antenna.

As a particular example, before requesting wireless device 110*b* to acquire the SI of cell 115*b* (the target cell), network node 120*a* may determine that network node 120*b* includes a single antenna for transmitting SI. Network node 120*a* may also determine that wireless device 110*b* includes a single receiver for receiving SI. After determining that network node 120*b* includes a single antenna and wireless device 110*b* includes a single receiver, network node 120*a* may determine not to request wireless device 110*b* to acquire the SI of target cell 115*b*.

As another example, before requesting wireless device 110*b* to acquire the SI of cell 115*c* (the target cell), network node 120*a* may determine that network node 120*c* includes four antennas for transmitting SI. Network node 120*a* may also determine that wireless device 110*b* includes a single receiver for receiving SI. Because network node 120*c* includes four antennas, network node 120*a* may request wireless device 110*b* to acquire the SI of target cell 115*c*. Wireless device 110*b* may create autonomous gaps to acquire the SI of target cell 115*c*.

In wireless network 100, each radio network node 120 may use any suitable radio access technology, such as long term evolution (LTE), LTE-Advanced, UMTS, HSPA, GSM, cdma2000, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 6 below. Similarly, a network node may include any suitable combination of hardware and/or software. For example, in particular embodiments, a network node, such as network node 120, may include the components described with respect to FIG. 7 below.

Figure 3:
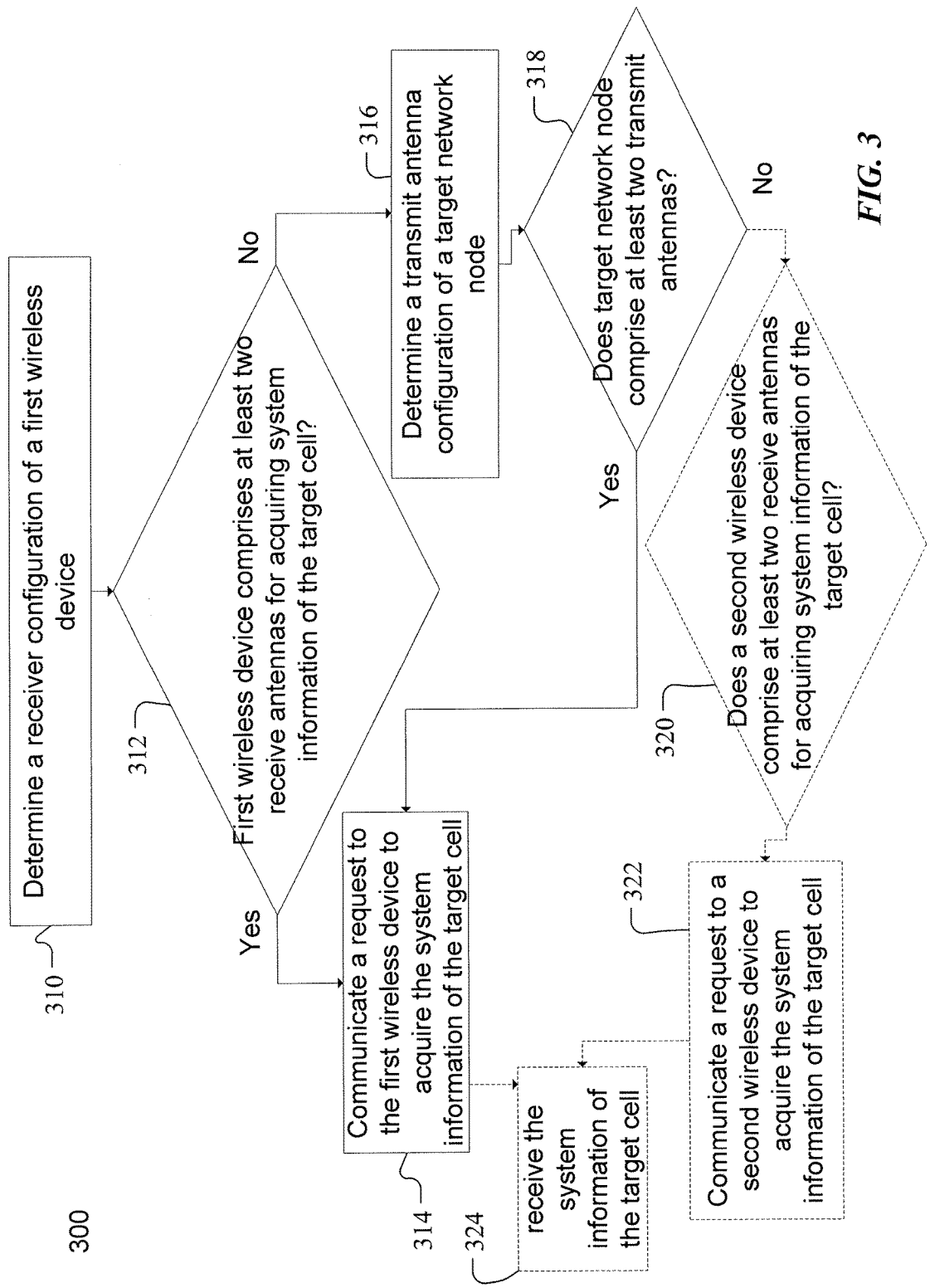
FIG. 3 is a flow diagram of a method in a network node of acquiring system information, according to particular embodiments.

FIG. 3 is a flow diagram of a method in a network node of acquiring system information, according to particular embodiments. In particular embodiments, one or more steps of method 300 may be performed by components of wireless network 100 described with reference to FIGS. 2, 6 and 7.

A first network node, such as network node 120*a*, may communicate a request to a first wireless device, such as wireless devices 110*a* or 110*b* to acquire SI (e.g., E-UTRA CGI) of a target cell, such as target cells 115*b* or 115*c*. The method begins at step 310 where a network node determines a receiver configuration of a first wireless device. As a particular example, in advance of communicating a request to acquire SI to wireless device 110*a*, network node 120*a* may determine a receiver configuration for wireless device 110*a*. Network node 120*a* may determine that wireless device 110*a* includes two receive antennas for acquiring system information. As another example, in advance of communicating a request to acquire SI to wireless device 110*b*, network node 120*a* may determine a receiver configuration for wireless device 110*b*. In this example, network node 120*a* may determine that wireless device 110*b* includes a single receive antenna for acquiring system information.

In particular embodiments, the network node may receive an explicit indication of a number of receivers from the wireless device. The wireless device may inform the network node that the wireless device includes N number of receivers and/or that the wireless device can use K number of receivers for acquiring SI of a target cell. For example, wireless device 110*a* may inform network node 120*a* that wireless device 110*a* includes two receivers. As another example, wireless device 110*b* may inform network node 120*a* that wireless device 110*b* includes a single receiver.

In particular embodiments, the network node may base its determination on radio measurement results from the wireless device. Radio measurement results may include RSRP measurements. Radio measurement results may include feedback information, such as a CQI value determined under a certain reference condition, such as under a static radio condition. The network node may compare the radio measurement results with a reference value or a threshold. For example, if a CQI value for a wireless connection 140 between network node 120*a* and wireless device 110*b* determined under given conditions is below a particular threshold, then network node 120*a* may assume that wireless device 120*b* includes a single receiver. In particular embodiments, the network node may use any suitable radio measurement to determine a receiver configuration of the wireless device.

At step 312, based on the receiver configuration determined in step 310, the network node determines whether the first wireless device comprises at least two receive antennas for acquiring system information of the target cell. If the first wireless device, such as wireless device 110*a*, comprises at least two receive antennas, then method 300 continues to step 314 where the network node communicates a request to the first wireless device, such as wireless device 110*a*, to acquire the system information of the target cell, such as target cell 115*b*.

If the first wireless device, such as wireless device 110*b*, comprises less than two receive antennas, then method 300 continues to step 316 where the network node determines a transmit antenna configuration of a target network node. For example, network node 120*a* may determine a transmit antenna configuration of target network node 120*b*.

In particular embodiments, the network node may receive an explicit indication from the target network node about the target network node's antenna configuration. For example, network node 120*a* may receive a message from target network node 120*b* indicating that target network node 120*b* includes a single transmit antenna.

In particular embodiments, the network node may receive an explicit indication from the wireless device informing the network node about the transmit antenna configuration of the target network node. The wireless device may determine the transmit antenna configuration of the target network node by performing measurements on target network node. For example, wireless device 110*a* may perform radio measurements on target network node 120*b* and determine that target network node 120*b* includes a single transmit antenna. Wireless device 110*a* may send a message to network node 120*a* indicating that target network node 120*b* includes a single transmit antenna.

In particular embodiments, the network node may rely on stored information. For example, network node 120*a* may store received or determined information about the transmit antenna configuration of network node 120*b* for later use when determining whether to request a wireless device to acquire SI of target cell 115*b*.

In particular embodiments, the network node may rely on default information. For example, a default transmit antenna configuration may correspond to a single transmit antenna. In particular embodiments, default configuration may be specified by a standard.

At step 318, the network node determines whether the target network node comprises at least two receive antennas for transmitting system information of the target cell. If the target network node comprises at least two transmit antennas, then method 300 continues to step 314 where the network node communicates a request to the first wireless device to acquire the system information of the target cell.

If the target network node, such as target network node 120*b*, comprises less than two transmit antennas, then method 300 may optionally continue to step 320. In some embodiments, method 300 may end at step 320. In some embodiments, at step 320, the network node may identify a second wireless device, such as wireless device 110*a*, having at least two receive antennas for acquiring the system information and communicate a request to the second wireless device to acquire the system information of the target cell. If the second wireless device, such as wireless device 110*a*, comprises at least two receive antennas, then method 300 continues to step 322 where the network node communicates a request to the second wireless device, such as wireless device 110*a*, to acquire the system information of the target cell, such as target cell 115*b*.

After steps 314 or 322, the network node may receive the measurement results (i.e., acquired SI) of the target cell from the first wireless device (e.g., step 314) or the second wireless device (e.g., step 320) at step 324. The network node may use this information for one or more tasks, for example, to perform a cell change of the first wireless device, to establish automatic neighbor relation between itself and the target cell, etc.

Modifications, additions, or omissions may be made to method 300. Additionally, one or more steps in method 300 of FIG. 3 may be performed in parallel or in any suitable order. For example, steps 310 and 316 may be performed in parallel or reverse order.

Figure 4:
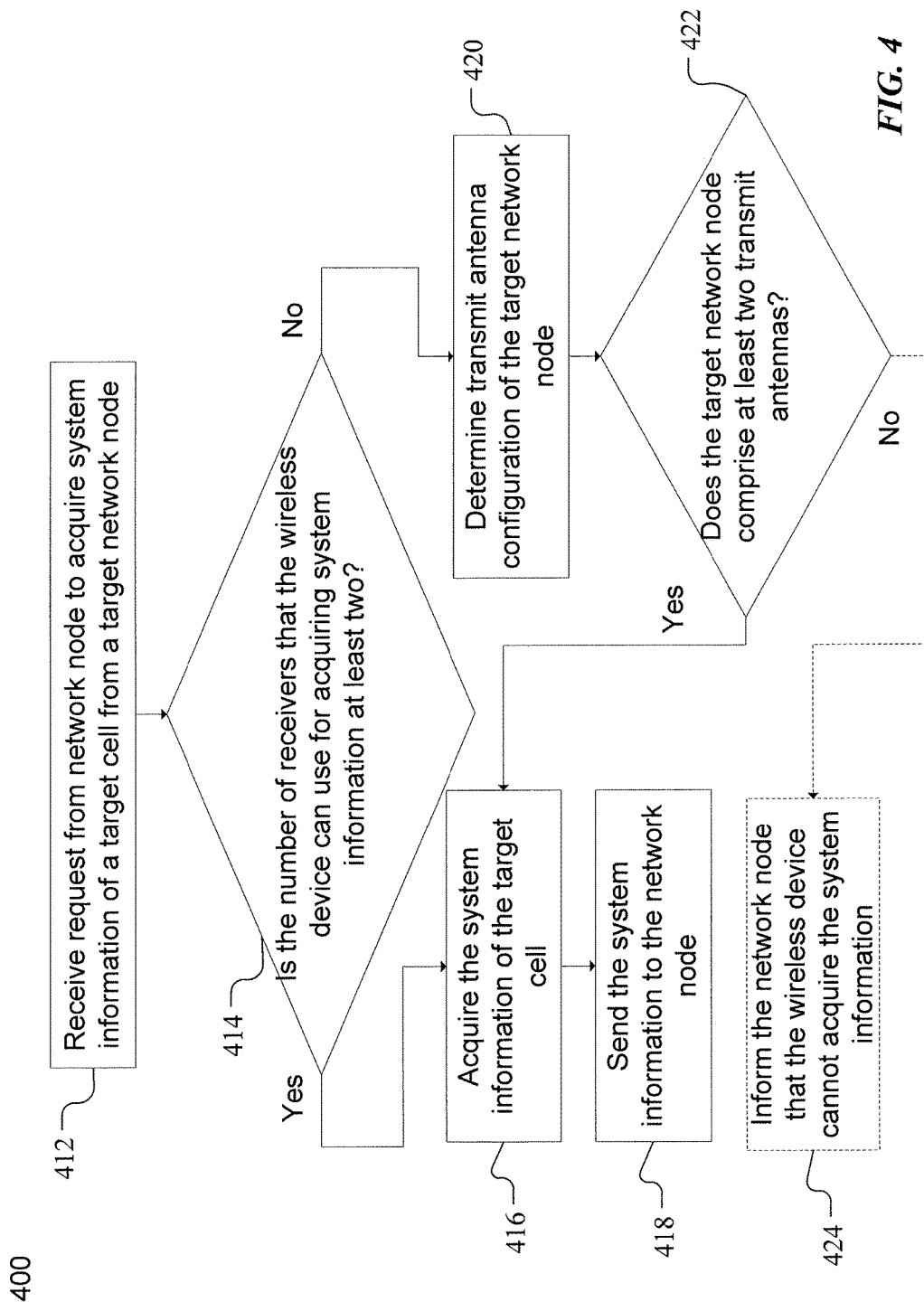
FIG. 4 is a flow diagram of a method in a wireless device of acquiring system information, according to particular embodiments.

FIG. 4 is a flow diagram of a method in a wireless device of acquiring system information, according to particular embodiments. In particular embodiments, one or more steps of method 400 may be performed by components of wireless network 100 described with reference to FIGS. 2, 6 and 7.

Method 400 begins at step 412 where a wireless device, such as wireless device 110a or 110b, receives a request from a network node, such as network node 120a, to acquire system information of a target cell, such as target cell 115b, from a target network node, such as target network node 120b. In particular embodiments, the request from the network node may include the physical cell ID (PCI) of the target cell.

At step 413, the wireless device determines its own receiver configuration. For example, wireless device 110a may determine it comprises two receivers for acquiring system information.

At step 414, if the number of receivers that the wireless device can use for acquiring system information is at least two, then the wireless device continues to step 416 where it acquires the system information of the target cell. As a particular example, wireless device 110a may receive a request to acquire the SI of target cell 115b at step 412, and wireless device 110a determines, at step 413, that it can use two receivers to receive SI. Thus, wireless device 110a will attempt to acquire the SI of target cell 115b at step 416.

If the wireless device determines that the number of receivers that it can use for acquiring system information is less than two, then the wireless device continues to step 420 where it determines a transmit antenna configuration of the target network node. As another example, wireless device 110b may receive a request to acquire the SI of target cell 115b at step 412, and wireless device 110b determines, at step 413, that it can use only a single receiver to receive the SI. Thus, wireless device 110b continues to step 420 and determines that target network node 120b can use only a single transmitter to transmit SI.

At step 422, if the target network node comprises at least two transmit antennas, then the wireless device continue to step 416 where it attempts to acquire the system information of the target cell. If the target network node, such a target network node 120b, comprises less than two transmit antennas, then the wireless device, such as wireless device 110b, may optionally continue to step 424.

In particular embodiments, the wireless device may determine the transmit antenna configuration of the target network node from the results of measurement procedures (e.g., while measuring RSRP and/or RSRQ of the target cell).

In particular embodiments, the wireless device may determine the transmit antenna configuration of the target network node based on information obtained and stored from a prior interaction with the target network node.

In particular embodiments, the wireless device may determine the transmit antenna configuration of the target network node based on an explicit indication, such as transmission mode. The wireless device may receive the explicit indication from the network node, the target network node, another wireless device, or any other suitable component of wireless network 100.

At optional step 424, the wireless device may communicate to the network node that the wireless device cannot acquire the system information. For example, wireless device 110b may send a message to target node 120a that wireless device 110b cannot acquire the SI of target cell 115b.

In particular embodiments, the wireless device may recommend to the network node that the wireless device can acquire the SI of another network node (e.g., target network node 120c) that has two or more transmit antennas.

At optional step 418, the wireless device may communicate the system information acquired at step 416 to the network node. For example, wireless device 110a may send a message including the SI of target cell 115b to network node 120a. In particular embodiments, the wireless device may perform autonomous actions based on the acquired SI.

Modifications, additions, or omissions may be made to method 400. Additionally, one or more steps in method 400 of FIG. 4 may be performed in parallel or in any suitable order. For example, steps 414 and 420 may be performed in parallel or reverse order.

In particular embodiments, a wireless device acquires the MIB using up to 5 blocks from the PBCH to facilitate decoding based on 3 blocks from the same 40 ms period. The MIB, carried on PBCH, is robustly encoded and for relevant SINR conditions at most 3 blocks are enough. Before tuning to the PBCH, the wireless device performs AGC and automatic frequency control (AFC). When assuming worst case configuration with respect to Multicast-Broadcast Single-Frequency Network (MBSFN), an additional 5 ms of radio time may be needed to allow additional time for performing AGC and AFC. The resulting gap may be up to 9 ms, and the remaining 4 gaps are 4 ms each.

After decoding the MIB, the wireless device attempts to decode the SIB1, which may be transmitted as one redundancy version in subframe 5 of every even system frame according to an 80 ms period. Before receiving SIB1, the wireless device changes its receiver bandwidth to the DL system bandwidth indicated by the MIB (e.g., 20 MHz). In the process, the wireless device determines a new gain (the wireless device re-runs AGC if the bandwidth is larger than the bandwidth that the MIB is transmitted over). For a wireless device that includes a single receiver antenna, up to 4 (i.e., all) redundancy versions may be needed to successfully decode the SIB1 under the propagation conditions and power levels foreseen to be useful. Should future network deployment scenarios or UE categories call for more redundancy versions, the wireless device can combine redundancy versions (RVs) from multiple 80 ms periods with the same modulation and coding scheme (MCS) and transport block size from the same system information modification period.

Figure 5:
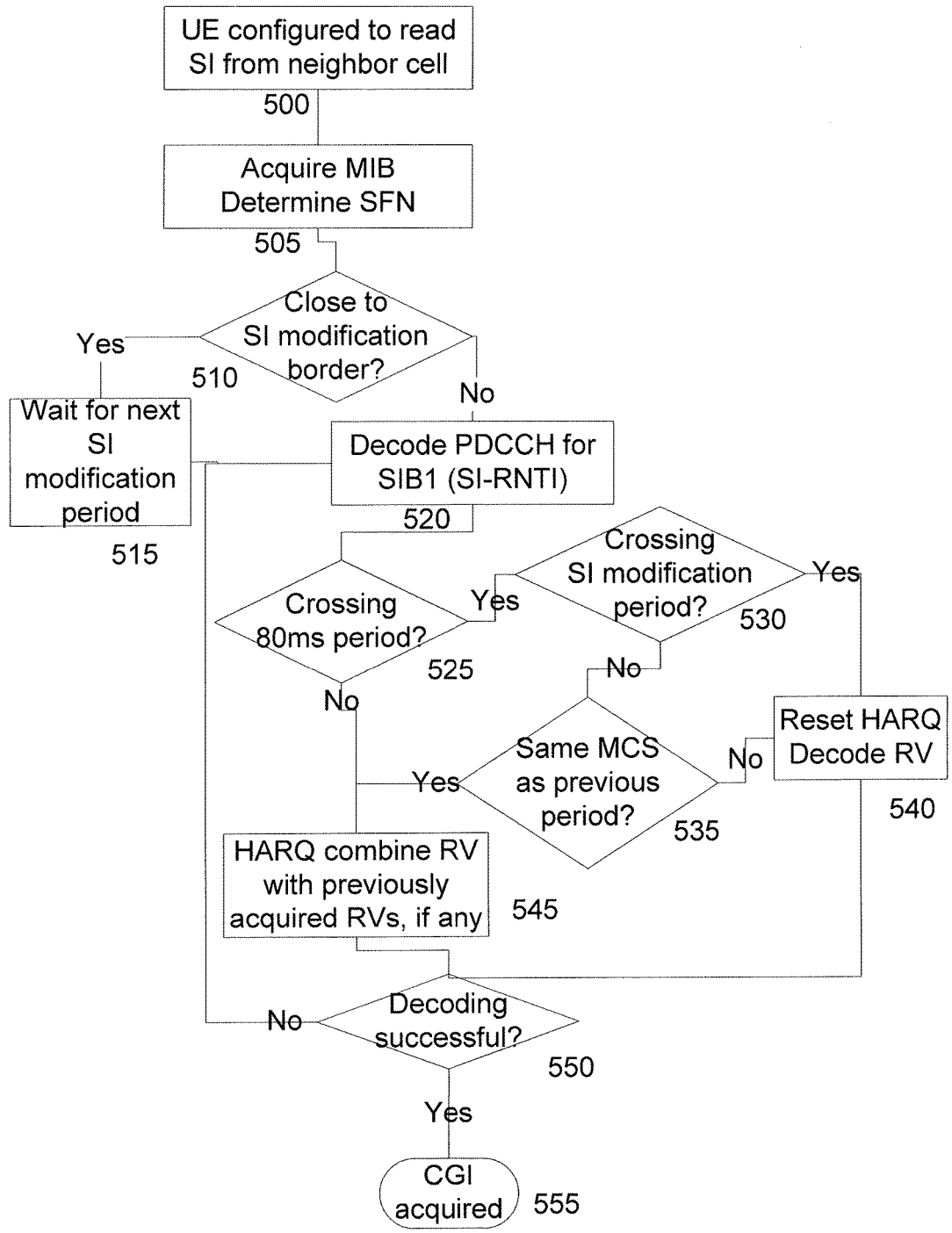
FIG. 5 is a flow diagram of a method of acquiring SIB1, according to particular embodiments.

FIG. 5 is a flow diagram of a method of acquiring SIB1, according to particular embodiments. In particular embodiments, one or more steps of method 500 may be performed by components of wireless network 100 described with reference to FIGS. 2, 6 and 7.

In particular embodiments, a wireless device may use the method of FIG. 5 to acquire the SIB1 across 80 ms boundaries. At step 500, a network node configures a wireless device to acquire system information (e.g., reading CGI of a neighbor cell). The wireless device acquires the MIB at step 505 and determines the SFN and the DL system bandwidth. With the SFN information, the wireless device may determine where to find SIB1, where the 80 ms SIB1 period begins, and the location of the system information modification border. In particular embodiments, if the wireless device does not have information on the modification period, the wireless device may assume that it coincides with the paging cycle. If the wireless device does not have prior information on the paging cycle, the wireless device may assume that it corresponds either to a typical value or to the shortest paging cycle (320 ms).

At step 510, the wireless device determines whether the next SI modification border is less than, for example 80 ms (one SIB1 period), away. If so, the wireless device waits for the next SI modification period before starting to decode SIB1 at step 515. If not, the wireless device may start decoding SIB1 at step 520.

At step 520, the wireless device decodes the PDCCH for the SI-RNTI in subframe 5 to acquire information on MCS, transport block size, and the resource block pairs carrying SIB1. At step 525, if an 80 ms period is crossed, then the wireless device continues to step 530. If an SI modification period boundary is not crossed at step 530, then the wireless device checks that the same MCS is used in the new 80 ms period at step 535. If not the wireless device resets the HARQ buffer at step 540. If the MCS is the same at step 535, then the wireless device soft combines with the redundancy versions that were acquired from the previous 80 ms period at step 545. If a SI modification boundary was crossed at step 520, then the wireless device resets the HARQ buffer at step 540 before decoding the received redundancy version.

At step 550, the wireless device decodes the SIB1 and if unsuccessful the wireless device returns to step 520 where it reads another redundancy version, and may continue in this manner until higher layers decide to give up the attempt to acquire the system information (e.g., upon a timer expiration). If successful, the method terminates and the system information, which may include CGI, may be provided to higher layers for reporting to the network.

In particular embodiments, more than 4 RVs may be soft combined unless the MCS changes or an SI modification boundary is crossed, which facilitates decoding of SIB1 under worse radio conditions than otherwise possible (due to the propagation channel and/or lack of Rx diversity), or quicker than otherwise possible since the UE does not have to begin the decoding at the start of an 80 ms period.

Modifications, additions, or omissions may be made to the method of FIG. 5. Additionally, one or more steps of the method of FIG. 5 may be performed in parallel or in any suitable order. In particular embodiments, the wireless device may restrict the SIB1 acquisition to only combine redundancy versions from the same 80 ms period. In such embodiments, if an 80 ms period is crossed, the HARQ may be reset at steps 525, 540 and 550, and steps 530 and 535 may be omitted.

Figure 6:
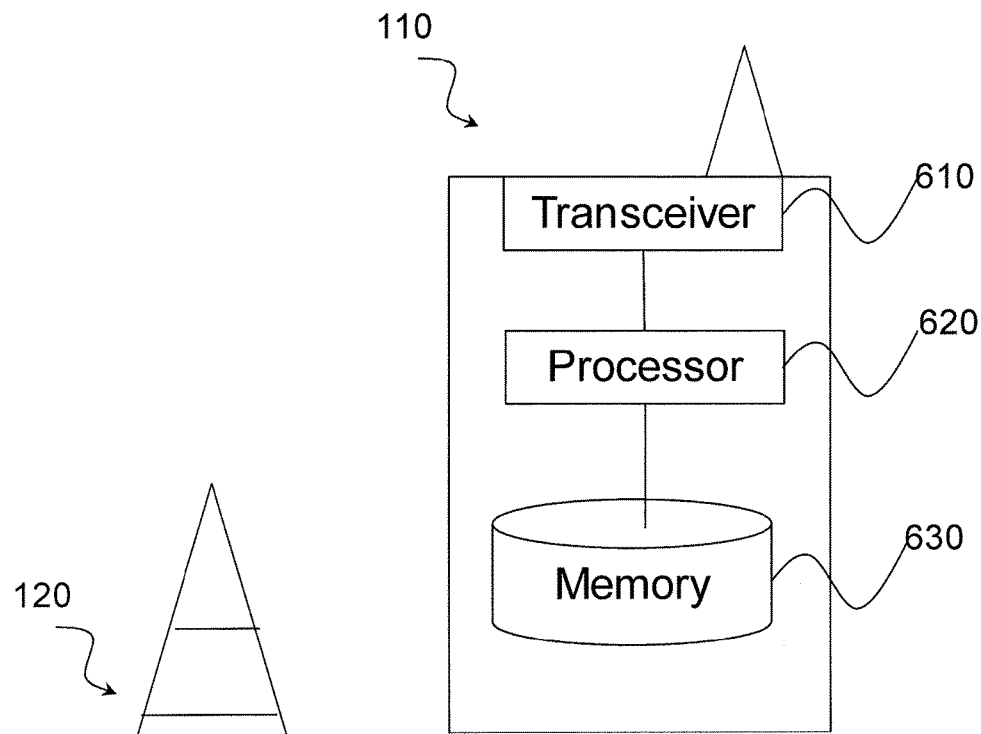
FIG. 6 is a block diagram illustrating an example embodiment of a wireless device.

FIG. 6 is a block diagram illustrating an example embodiment of a wireless device. The wireless device is an example of the wireless devices 110 illustrated in FIG. 2. Particular examples include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or any other device that can provide wireless communication. The wireless device includes transceiver 610, processor 620, and memory 630. In some embodiments, transceiver 610 facilitates transmitting wireless signals to and receiving wireless signals from wireless network node 120 (e.g., via an antenna), processor 620 executes instructions to provide some or all of the functionality described herein as provided by the wireless device, and memory 630 stores the instructions executed by processor 620.

Processor 620 includes any suitable combination of hardware and software implemented in one or more integrated circuits or modules to execute instructions and manipulate data to perform some or all of the described functions of the wireless device. In some embodiments, processor 620 may include, for example, one or more computers, one more programmable logic devices, one or more central processing units (CPUs), one or more microprocessors, one or more applications, and/or other logic, and/or any suitable combination of the preceding. Processor 620 may include analog and/or digital circuitry configured to perform some or all of the described functions of wireless device 110. For example, processor 620 may include resistors, capacitors, inductors, transistors, diodes, and/or any other suitable circuit components.

Memory 630 is generally operable to store computer executable code and data. Examples of memory 630 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

In particular embodiments, processor 620 in communication with transceiver 610 acquires system information from radio network node 120. Other embodiments of the wireless device may include additional components (beyond those shown in FIG. 6) responsible for providing certain aspects of the wireless device's functionality, including any of the functionality described above and/or any additional functionality (including any functionality necessary to support the solution described above).

In particular embodiments, wireless device 110 may include a determining module, a communication module, and an acquisition module. The determining module may perform the processing functions of wireless device 110 related to determining a number of transmitters or receivers associated with a particular component of network 100. For example, the determining module may determine a transmitter configuration of a network node 120. As another example, the determining module may determine a receiver configuration of a wireless device 110. In certain embodiments, the determining module may include or be included in processor 620. The determining module may include analog and/or digital circuitry configured to perform any of the functions of the determining module and/or processor 620.

The communication module may perform the transmission functions of wireless device 110. For example, the communication module may communicate information determined by the determining module or the acquisition module to network node 120 or other wireless devices 110. As another example, the communication module may transmit messages to network node 120 of network 100. The communication module may also receive information from network node 120 or other wireless devices 110. For example, the communication module may receive request messages from network node 120. In certain embodiments, the communication module may include or be included in transceiver 610. The communication module may include a transmitter and/or a transceiver. In certain embodiments, the communication module may include or be included in processor 620. The communication module may include circuitry configured to wirelessly transmit messages and/or signals. In particular embodiments, the communication module may receive messages and/or signals for transmission to/from the determining module.

The acquisition module may perform the system information acquisition functions of wireless device 110. For example, the acquisition module may determine how to read and decode signals, such as signals comprising system information, transmitted from target network node 120. In certain embodiments, the acquisition module may include or be included in processor 620. The acquisition module may include circuitry configured to wirelessly transmit messages and/or signals. In particular embodiments, the acquisition module may include analog and/or digital circuitry configured to perform any of the functions of the acquisition module and/or processor 620.

Figure 7:
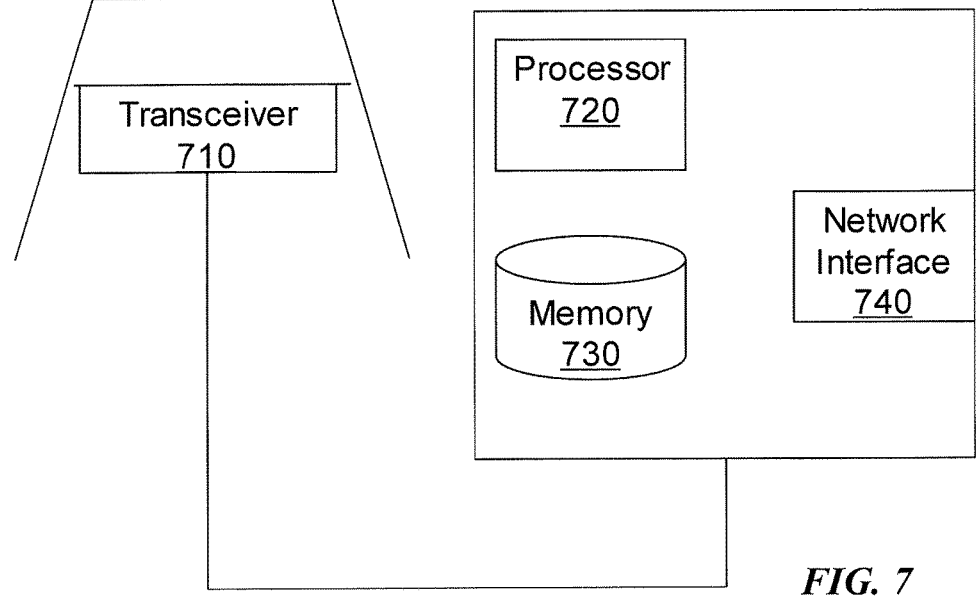
FIG. 7 is a block diagram illustrating an example embodiment of a network node.

FIG. 7 is a block diagram illustrating an example embodiment of a network node. Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. Network node 120 includes at least one transceiver 710, at least one processor 720, at least one memory 730, and at least one network interface 740. Transceiver 710 facilitates transmitting wireless signals to and receiving wireless signals from a wireless device, such as wireless devices 110 (e.g., via an antenna); processor 720 executes instructions to provide some or all of the functionality described above as being provided by a network node 120; memory 730 stores the instructions executed by processor 720; and network interface 740 communicates signals to backend network components, such as a gateway, switch, router, Internet, Public Switched Telephone Network (PSTN), controller, and/or other network nodes 120. Processor 720 and memory 730 can be of the same types as described with respect to processor 620 and memory 630 of FIG. 6 above.

In some embodiments, network interface 740 is communicatively coupled to processor 720 and refers to any suitable device operable to receive input for network node 120, send output from network node 120, perform suitable processing of the input or output or both, communicate to other devices, or any combination of the preceding. Network interface 740 includes appropriate hardware (e.g., port, modem, network interface card, etc.) and software, including protocol conversion and data processing capabilities, to communicate through a network.

In particular embodiments, processor 720 in communication with transceiver 710 transmits, to wireless device 110, signals containing system information. In particular embodiments, processor 720 in communication with transceiver 710 transmits system information signals as described above to wireless device 110.

Other embodiments of network node 120 include additional components (beyond those shown in FIG. 7) responsible for providing certain aspects of the network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

In particular embodiments, network node 120 may include a determining module and a communication module. The determining module may perform the processing functions of network node 120 related to determining a number of transmitters or receivers associated with a particular component of network 100. For example, the determining module may determine a transmitter configuration of another network node 120. As another example, the determining module may determine a receiver configuration of a wireless device 110. In certain embodiments, the determining module may include or be included in processor 720. The determining module may include analog and/or digital circuitry configured to perform any of the functions of the determining module and/or processor 720.

The communication module may perform the transmission functions of network node 120. For example, the communication module may communicate information determined by the determining module to wireless devices 110 or another network node 120. For example, the communication module may transmit request messages to wireless device 110. The communication module may also receive information from wireless device 110 or other network nodes 120. For example, the communication module may receive system information acquired by wireless device 110 or receive configuration information from another network node 120. In certain embodiments, the communication module may include or be included in transceiver 710. The communication module may include a transmitter and/or a transceiver. In certain embodiments, the communication module may include or be included in processor 720. The communication module may include circuitry configured to wirelessly transmit messages and/or signals. In particular embodiments, the communication module may receive messages and/or signals for transmission to/from the determining module.

Some embodiments of the disclosure may provide one or more technical advantages. As an example, in some embodiments, radio resources in both eNodeBs and UEs may be used more efficiently. In particular embodiments, single-receiver UEs may avoid creating unnecessary autonomous gaps and therefore may conserve radio resources in both the uplink (UL) and downlink (DL). Particular embodiments may reduce baseband processing and power consumption in particular UEs. In particular embodiments, a network node may acquire SI of a target cell from another UE that is better equipped to acquire the SI, such as a UE that has more than one receiver. In particular embodiments, SIB1 may be decoded under worse radio conditions than would otherwise be possible in a UE without receiver diversity. In particular embodiments, SIB1 may be decoded more quickly than otherwise possible because a UE is not required to begin decoding at the start of an 80 ms period Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Particular 3GPP specifications may be modified to include particular embodiments of this disclosure. For example, 3GPP specification TS 36.133 may include the following subsections:

8.5.2.1.4 E-UTRAN FDD Intra Frequency Measurements with Autonomous Gaps for UE category 0

The requirements defined in this subclause 8.5.2.1.4 apply provided the following condition is met:

Tx diversity or transmission using multiple antennas are supported in the target cell to be detected.

8.5.2.1.4.1 Identification of a New CGI of E-UTRA Cell with Autonomous Gaps

No explicit neighbor list is provided to the UE for identifying a new CGI of E-UTRA cell. The UE shall identify and report the CGI when requested by the network for the purpose "reportCGI". The UE may make autonomous gaps in downlink reception and uplink transmission for receiving MIB and SIB1 message according to clause 5.5.3.1 of TS 36.331. Note that a UE is not required to use autonomous gap if si-RequestForHO is set to false. If autonomous gaps are used for measurement with the purpose of "reportCGI", regardless of whether DRX is used or not, or whether SCell(s) are configured or not, the UE shall be able to identify a new CGI of E-UTRA cell within:

$$T_{identify\_CGI\_LC-UE,intra} = T_{basic\_identify\_CGI\_LC-UE,intra} \text{ms}$$

Where $T_{basic\_identify\_CGI\_LC-UE,intra}$=190 ms. This is the time period used in the above equation where the maximum allowed time for the UE to identify a new CGI of an E-UTRA cell is defined, provided that the E-UTRA cell has been already identified by the UE.

A cell shall be considered identifiable when the following conditions are fulfilled:

RSRP related side conditions given in Clause 9.1 are fulfilled for a corresponding Band, SCH_RP and SCH Ês/Iot according to Annex B.2.2 for a corresponding Band The MIB of an E-UTRA cell whose CGI is identified shall be considered decodable by the UE provided the PBCH demodulation requirements are met according to particular requirements.

The requirement for identifying a new CGI of an E-UTRA cell within $T_{basic\_identify\_CGI\_LC-UE,intra}$ is applicable when no DRX is used as well as when all the DRX cycles specified in TS 36.331 are used.

Within the time $T_{basic\_identify\_CGI\_LC-UE,intra}$ms, over which the UE identifies the new CGI of E-UTRA cell, the UE shall transmit at least 92 ACK/NACKs on PCell provided that:

there is continuous DL data allocation,
no DRX cycle is used,
no measurement gaps are configured,
only one code word is transmitted in each subframe,
no MBSFN subframes are configured in the PCell or each of activated SCell(s).

8.5.2.1.4.2 ECGI Reporting Delay

The ECGI reporting delay occurs due to the delay uncertainty when inserting the ECGI measurement report to the TTI of the uplink DCCH. The delay uncertainty is twice the TTI of the uplink DCCH. In case DRX is used, the ECGI reporting may be delayed until the next DRX cycle. If IDC autonomous denial is configured, an additional delay can be expected.

8.5.2.1.5 E-UTRAN Intra Frequency Measurements with Autonomous Gaps for HD-FDD UE category 0

The requirements in this section are applicable for the UE which supports half duplex FDD operation on one or more supported frequency bands.

The requirements defined in this subclause 8.5.2.1.5 apply provided the following condition is met:

Tx diversity or transmission using multiple antennas are supported in the target cell to be detected.

8.5.2.1.5.1 Identification of a New CGI of E-UTRA Cell with Autonomous Gaps

All the CGI requirements with the exception of requirement on the number of ACK/NACK transmission on PCell defined in clause 8.5.2.1.4.1 also apply for this section.

For the UE supporting half duplex FDD operation there is no requirement in terms of number of ACK/NACK transmission on PCell.

8.5.2.1.5.2 ECGI Reporting Delay

The ECGI reporting delay defined in clause 8.5.2.1.4.2 also apply for this section.

8.5.2.1.6 E-UTRAN TDD Intra Frequency Measurements with Autonomous Gaps for UE category 0

The requirements defined in this subclause 8.5.2.1.6 apply provided the following condition is met:

Tx diversity or transmission using multiple antennas are supported in the target cell to be detected.

8.5.2.1.6.1 Identification of a New CGI of E-UTRA Cell with Autonomous Gaps

No explicit neighbor list is provided to the UE for identifying a new CGI of E-UTRA cell. The UE shall identify and report the CGI when requested by the network for the purpose "reportCGI". The UE may make autonomous gaps in downlink reception and uplink transmission for receiving MIB and SIB1 messages according to clause 5.5.3.1 of TS 36.331. Note that a UE is not required to use autonomous gap if si-RequestForHO is set to false. If autonomous gaps are used for measurement with the purpose of "reportCGI", regardless of whether DRX is used or not, or whether SCell(s) are configured or not, the UE shall be able to identify a new CGI of E-UTRA cell within:

$$T_{identify\_CGI\_LC-UE,intra} = T_{basic\_identify\_CGI\_LC-UE,intra} \text{ms}$$

Where $T_{basic\_identify\_CGI\_LC-UE,intra}$=190 ms. This is the time period used in the above equation where the maximum allowed time for the UE to identify a new CGI of an E-UTRA cell is defined, provided that the E-UTRA cell has been already identified by the UE.

A cell shall be considered identifiable when the following conditions are fulfilled:

RSRP related side conditions given in Clause 9.1 are fulfilled for a corresponding Band, SCH_RP and SCH Ês/Iot according to Annex B.2.2 for a corresponding Band The MIB of an E-UTRA cell whose CGI is identified shall be considered decodable by the UE provided the PBCH demodulation requirements are met according to particular requirements.

The requirement for identifying a new CGI of an E-UTRA cell within $T_{basic\_identify\_CGI\_LC-UE,intra}$ is applicable when no DRX is used as well as when all the DRX cycles specified in TS 36.331 are used.

Within the time, $T_{identify\_CGI\_LC-UE,intra}$ms, over which the UE identifies the new CGI of E-UTRA cell, the UE shall be able to transmit at least the number of ACK/NACKs stated in Table 8.5.2.1.6.1-1 on PCell provided that:

there is continuous DL data allocation,
no DRX cycle is used,
no measurement gaps are configured,
only one code word is transmitted in each subframe,
no MBSFN subframes are configured in the PCell or each of activated SCell(s).

TABLE 8.5.2.1.6.1-1

Requirement on minimum number of ACK/NACKs to transmit during $T_{basic\_identify\_CGI\_LC-UE\_intra}$:

| UL/DL configuration | Minimum number of transmitted ACK/NACKs |
|---|---|
| 0 (Note 1) | [30] |
| 1 | [54] |
| 2 | [68] |
| 3 | [56] |
| 4 | [61] |
| 5 | [66] |
| 6 | [46] |

Note 1:
Particular embodiments may not include this configuration.

8.5.2.1.6.2 ECGI Reporting Delay

The ECGI reporting delay occurs due to the delay uncertainty when inserting the ECGI measurement report to the TTI of the uplink DCCH. The delay uncertainty is twice the TTI of the uplink DCCH. In case DRX is used, the ECGI reporting may be delayed until the next DRX cycle. If IDC autonomous denial is configured, an additional delay can be expected.

Abbreviations used in the preceding description include:
3GPP Third Generation Partnership Project
ACK Acknowledged
ADC Analog-to-Digital Conversion
AGC Automatic Gain Control
ANR Automatic Neighbor Relations
AP Access Point
BCH Broadcast Channel
BLER Block Error Rate
BS Base Station
BSC Base Station Controller
BTS Base Transceiver Station
CA Carrier Aggregation
CC Component Carrier
CG Cell Group
CGI Cell Global Identity
CP Cyclic Prefix
CPICH Common Pilot Channel
CSG Closed Subscriber Group
DAS Distributed Antenna System
DC Dual Connectivity
DFT Discrete Fourier Transform
DL Downlink
DL-SCH Downlink Shared Channel
DRX Discontinuous Reception
EARFCN Evolved Absolute Radio Frequency Channel Number
ECGI Evolved CGI
eNB eNodeB
FDD Frequency Division Duplex
FFT Fast Fourier Transform
HD-FDD Half Duplex FDD
HO Handover
M2M Machine to Machine
MAC Media Access Control
MCG Master Cell Group
MDT Minimization of drive tests
MeNB Master eNodeB
MIB Master Information Block
MME Mobility Management Entity
MRTD Maximum Receive Timing Difference
MSR Multi-Standard Radio
NACK Not Acknowledged
OFDM Orthogonal Frequency Division Multiplexing
SI System Information
PCC Primary Component Carrier
PCI Physical Cell Identity
PCell Primary Cell
PCG Primary Cell Group
PCH Paging Channel
PDU Protocol Data Unit
PGW Packet Gateway
PHICH Physical HARQ Indication Channel
PLMN Public Land Mobile Network
PSCell Primary SCell
PSC Primary Serving Cell
PSS Primary Synchronization Signal
RAT Radio Access Technology
RF Radio Frequency
RLM Radio link Monitoring
RNC Radio Network Controller
RRC Radio Resource Control
RRH Remote Radio Head
RRU Remote Radio Unit
RSCP Received Signal Code Power
RSRP Reference Signal Received Power
RSRQ Reference Signal Received Quality
RSSI Received Signal Strength Indication
RSTD Reference Signal Time Difference
RV Redundancy Version
Rx Receiver
SCC Secondary Component Carrier
SCell Secondary Cell
SCG Secondary Cell Group
SeNB Secondary eNodeB
SFN System Frame Number
SGW Signaling Gateway
SI System Information
SIB System Information Block
SIB1 System Information Block Type 1
SINR Signal to Interference and Noise Ratio
SON Self-Organizing Networks
SSC Secondary Serving Cell
SSS Secondary Synchronization Signal
TA Timing Advance
TAG Timing Advance Group
TDD Time Division Duplex
Tx Transmitter
UARFCN UMTS Absolute Radio Frequency Channel Number
UE User Equipment
UL Uplink

The invention claimed is:

1. A method performed by a network node comprising:
   determining, by the network node, a transmitter configuration of a target network node of a target cell;
   determining, by the network node, a receiver configuration of a first wireless device;
   determining, by the network node, based on one or more of the determined transmitter configuration of the target network node and the determined receiver configuration of the first wireless device, whether the wireless device will be able to acquire system information of the target cell; and performing one of:
communicating, by the network node, a request to the first wireless device to acquire the system information of the target cell if:
the determined receiver configuration of the first wireless device indicates that the first wireless device comprises at least two antennas for acquiring system information of the target cell; or
the determined transmitter configuration of the target network node indicates that the target network node comprises at least two antennas for transmitting system information of the target cell; and
refraining from communicating the request to the first wireless device to acquire the system information of the target cell if:
the determined receiver configuration of the first wireless device indicates that the first wireless device comprises less than two antennas for acquiring system information of the target cell; and
the determined transmitter configuration of the target network node indicates that the target network node comprises less than two antennas for transmitting system information of the target cell.

2. The method of claim 1, further comprising, receiving, from the first wireless device, the system information of the target cell.

3. The method of claim 2, further comprising performing a handover to the target network node for the first wireless device based on the received system information.

4. The method of claim 2, further comprising establishing an automatic neighbor relation between the network node and the target network node based on the received system information.

5. The method of claim 1, further comprising:
determining the receiver configuration of the first wireless device indicates that the first wireless device comprises less than two antennas for acquiring system information of the target cell and determining the transmitter configuration of the target network node indicates that the target network node comprises less than two antennas for transmitting system information of the target cell;
determining a receiver configuration associated with a second wireless device; and
communicating a request to the second wireless device to acquire the system information of the target cell if the receiver configuration of the second wireless device indicates that the second wireless device comprises at least two antennas for acquiring system information of the target cell.

6. The method of claim 1, wherein the request to acquire system information of the target cell comprises a physical cell identifier of the target cell.

7. The method of claim 1, wherein the system information of the target cell comprises one or more of:
a cell global identifier (CGI) of the target cell;
a system frame number (SFN) of the target cell;
a master information block (MIB) of the target cell; and
a system information block (SIB) of the target cell.

8. A method performed by a wireless device comprising:
receiving, by the wireless device, a request from a network node to acquire system information of a first target cell from a first target network node;
determining, by the wireless device, a transmitter configuration of the first target network node;
determining, by the wireless device, a receiver configuration of the wireless device;
determining, by the wireless device, based on one or more of the determined transmitter configuration of the first target network node and the determined receiver configuration of the wireless device, whether the wireless device will be able to acquire system information of the first target cell; and performing one of:
acquiring, by the wireless device, the system information of the first target cell if:
the determined receiver configuration of the wireless device indicates that the wireless device comprises at least two antennas for acquiring system information of the first target cell; or
the determined transmitter configuration of the first target network node indicates that the first target network node comprises at least two antennas for transmitting system information of the first target cell; and
refraining from acquiring the system information of the first target cell if:
the determined receiver configuration of the wireless device indicates that the wireless device comprises less than two antennas for acquiring system information of the first target cell; and
the determined transmitter configuration of the first target network node indicates that the first target network node comprises less than two antennas for transmitting system information of the first target cell.

9. The method of claim 8, further comprising communicating the acquired system information to the network node.

10. The method of claim 8, further comprising:
determining the receiver configuration of the wireless device indicates that the wireless device comprises less than two antennas for acquiring system information of the first target cell and determining the transmitter configuration of the first target network node indicates that the first target network node comprises less than two antennas for transmitting system information of the first target cell; and
communicating an indication to the network node that the wireless device cannot acquire the system information of the first target cell.

11. The method of claim 8, further comprising:
determining the receiver configuration of the wireless device indicates that the wireless device comprises less than two antennas for acquiring system information of the first target cell and determining the transmitter configuration of the first target network node indicates that the first target network node comprises less than two antennas for transmitting system information of the first target cell; and
communicating an indication to the network node that the wireless device can acquire the system information of a second target cell, the second target cell including a second target network node comprising at least two antennas for transmitting system information of the second target cell.

12. The method of claim 8, wherein the request from the network node to acquire system information of the first target cell comprises a physical cell identifier of the first target cell.

13. The method of claim 8, wherein the system information of the target cell comprises one or more of:
a cell global identifier (CGI) of the target cell;
a system frame number (SFN) of the target cell;
a master information block (MIB) of the target cell; and
a system information block (SIB) of the target cell.

14. A network node comprising:
a memory;
a network interface;
a transceiver; and
one or more processors coupled to the memory, the network interface, and the transceiver, the one or more processors of the network node configured to:
determine a transmitter configuration of a target network node of a target cell;
determine a receiver configuration of a first wireless device;
determine, based on one or more of the determined transmitter configuration of the target network node and the determined receiver configuration of the first wireless device, whether the wireless device will be able to acquire system information of the target cell;
communicate a request to the first wireless device to acquire system information of the target cell if:
the determined receiver configuration of the first wireless device indicates that the first wireless device comprises at least two antennas for acquiring system information of the target cell; or
the determined transmitter configuration of the target network node indicates that the target network node comprises at least two antennas for transmitting system information of the target cell; and
refrain from communicating the request to the first wireless device to acquire the system information of the target cell if:
the determined receiver configuration of the first wireless device indicates that the first wireless device comprises less than two antennas for acquiring system information of the target cell; and
the determined transmitter configuration of the target network node indicates that the target network node comprises less than two antennas for transmitting system information of the target cell.

15. The network node of claim 14, the one or more processors further operable to receive, from the first wireless device, the system information of the target cell.

16. The network node of claim 12, the one or more processors further operable to perform a handover to the target network node for the first wireless device based on the received system information.

17. The network node of claim 12, the one or more processors further operable to establish an automatic neighbor relation between the network node and the target network node based on the received system information.

18. The network node of claim 14, the one or more processors further operable to:
determine the receiver configuration of the first wireless device indicates that the first wireless device comprises less than two antennas for acquiring system information of the target cell and the transmitter configuration of the target network node indicates that the target network node comprises less than two antennas for transmitting system information of the target cell;
determine a receiver configuration of a second wireless device; and
communicate a request to the second wireless device to acquire the system information of the target cell if the receiver configuration of the second wireless device indicates that the second wireless device comprises at least two antennas for acquiring system information of the target cell.

19. The network node of claim 14, wherein the request to acquire system information of the target cell comprises a physical cell identifier of the target cell.

20. The network node of claim 14, wherein the system information of the target cell comprises one or more of:
a cell global identifier (CGI) of the target cell;
a system frame number (SFN) of the target cell;
a master information block (MIB) of the target cell; and
a system information block (SIB) of the target cell.

21. A wireless device comprising:
a memory;
a transceiver; and
one or more processors coupled to the memory and the transceiver, the one or more processors of the wireless device configured to:
receive a request from a network node to acquire system information of a first target cell from a first target network node;
determine a transmitter configuration of the first target network node;
determine a receiver configuration of the wireless device;
determine, by the wireless device, based on one or more of the determined transmitter configuration of the first target network node and the determined receiver configuration of the wireless device, whether the wireless device will be able to acquire system information of the first target cell;
acquire the system information of the first target cell if:
the determined receiver configuration of the wireless device indicates that the wireless device comprises at least two antennas for acquiring system information of the first target cell; or
the determined transmitter configuration of the first target network node indicates that the first target network node comprises at least two antennas for transmitting system information of the first target cell; and
refrain from acquiring the system information of the first target cell if:
the determined receiver configuration of the wireless device indicates that the wireless device comprises less than two antennas for acquiring system information of the first target cell; and
the determined transmitter configuration of the first target network node indicates that the first target network node comprises less than two antennas for transmitting system information of the first target cell.

22. The wireless device of claim 21, the one or more processors operable to communicate the acquired system information to the network node.

23. The wireless device of claim 21, the one or more processors operable to:
determine the receiver configuration of the wireless device indicates that the wireless device comprises less than two antennas for acquiring system information of the first target cell and the transmitter configuration of the first target network node indicates that the target network node comprises less than two antennas for transmitting system information of the first target cell; and communicate an indication to the network node that the wireless device cannot acquire the system information of the first target cell.

24. The wireless device of claim 21, the one or more processors operable to:

determine the receiver configuration of the wireless device indicates that the wireless device comprises less than two antennas for acquiring system information of the first target cell and determine that the transmitter configuration of the first target network node indicates that the target network node comprises less than two antennas for transmitting system information of the first target cell; and communicate an indication to the network node that the wireless device can acquire the system information of a second target cell, the second target cell including a second target network node comprising at least two antennas for transmitting system information of the second target cell.

25. The wireless device of claim 21, wherein the request from the network node to acquire system information of the first target cell comprises a physical cell identifier of the first target cell.

26. The wireless device of claim 21, wherein the one or more processors are operable to acquire the system information of the target cell by creating autonomous gaps.

* * * * *